United States Patent Office 3,433,809
Patented Mar. 18, 1969

3,433,809
TRIS(2-HALO-3,4-EPOXYBUTYL) PHOSPHATE
Gerald Joseph Trudel, Hilaire, Quebec, Canada, assignor to Canadian Industries Limited, Montreal, Quebec, Canada, a corporation of Canada
No Drawing. Filed May 11, 1964, Ser. No. 366,615
Claims priority, application Canada, June 4, 1963, 877,187
U.S. Cl. 260—348
Int. Cl. C07f 9/08
2 Claims

ABSTRACT OF THE DISCLOSURE

Reaction products of an epoxidized material containing at least two epoxide groups per molecule, e.g., butadiene dioxide, and a phosphorus oxyhalide such as phosphorus oxychloride or phosphorus oxybromide. The proportions of reactants lie in the range of 2 to 4 moles of epoxidized material to each mole of phosphorus oxyhalide. Examples of the reaction products are tris(2-chloro-3,4-epoxybutyl) phosphate and tris(2-bromo-3,4-epoxybutyl) phosphate. The reaction products are useful as ingredients in the production of flame retardant foamed cellular materials.

---

This invention relates to new materials suitable for the production of solid polymeric foams and to the foams derived from said materials.

Foamed-in-place cellular materials are coming into wide-spread use as insulation against heat and mechanical shock. At present the most popular of such foamed materials are the polyurethanes prepared by the interaction of polyisocyanates and hydroxyl-terminated polyesters or polyethers. However, the polyurethanes have undesirable flammability characteristics and their isocyanate ingredients are toxic.

The primary object of this invention is to provide new materials suitable for the production of a novel type of foamed-in-place cellular material capable of many industrial applications. Another object is to provide a novel type of foamed cellular material of low toxicity and flammability. Additional objects will appear hereinafter.

Broadly speaking, the new foam-producing materials of this invention are the reaction products of an epoxidized material containing at least two epoxide groups per molecule and a phosphorus oxyhalide, the proportions of the ingredients being such that the reaction products contain free epoxide groups.

A suitable method of preparing the foams is to first react the epoxidized material containing at least two epoxide groups per molecule with the phosphorus oxyhalide in proportion of about three moles of epoxidized material to each mole of phosphorus oxyhalide, employing a weak acid catalyst, and then mix the intermediate thus formed, with or without additional epoxidized material, with a strong acid catalyst, a halogenated hydrocarbon foaming agent and, optionally, a silicone surfactant to form a cellular polymerized material.

By "epoxidized material containing at least two epoxide groups per molecule" is meant a compound containing two or more groups of the formula

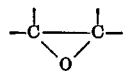

in its molecule, e.g. butadienedioxide, dipentene dioxide, polyallyl glycidyl ether, epoxidized polybutadiene, epoxidized styrenebutadiene copolymers and the resinous condensates of epichlorohydrin and aliphatic or aromatic polyols such as glycerol or 2:2-di-p-hydroxyphenyl propane.

Examples of suitable phosphorus oxyhalides are phosphorus oxybromide of formula $POBr_3$ and phosphorus oxychloride of formula $POCl_3$.

By "halogenated hydrocarbon foaming agent" is meant a halogenated hydrocarbon whose boiling point at atmospheric pressure is less than 150° C. but usually above 20° C. For usage under winter conditions and in froth dispensing machines, a boiling point lower than 20° C. is necessary. The heat of the polymerization reaction causes the foaming agent to boil forming bubbles which expand during the polymerization reaction to give a low density foamed mass. Suitable foaming agents are trichloromonofluoromethane, dichlorotetrafluoroethane, trichlorotrifluoroethane, dibromodifluoromethane, dichlorohexafluorocyclobutane, methylene chloride, chloroform, trichloroethylene, carbon tetrachloride and perchloroethylene.

The acid catalysts suitable for the catalyzing of the reactions of this invention include aluminum chloride, ferric chloride, boron trichloride and boron trifluoridetrimethoxyboroxine mixtures. The catalyst employed for the preparation of the above described intermediate must possess a lower activity than the catalyst employed in the foaming reaction. Thus aluminum chloride or ferric chloride are suitable catalysts for preparing the intermediate and boron trifluoride and boron trifluoride-trimethoxy-boroxine mixtures are suitable for catalyzing the foaming reaction. Suitable proportions of catalyst are from 0.2% to 3% by weight.

Examples of suitable surfactants are given in Belgian Patents Nos. 582,362 and 584,089, being of the siloxane oxyalkylene copolymer type.

The preferred foam-producing intermediate consists of the reaction product of butadiene dioxide and phosphorus oxybromide or phosphorus oxychloride in molar ratios ranging between 2:1 and 4:1. This intermediate imparts to foams of which it is an ingredient both flame-retardant and moisture-resistant properties. When the preferred intermediate derived from butadiene dioxide is employed in foaming compositions, it is desirable that it be admixed with additional epoxidized material containing two or more epoxide groups per molecule, said additional epoxidized material having a molecular weight greater than about 250. The relative proportions of intermediate and additional epoxidized material may vary from 100% intermediate to an intermediate/additional epoxidized material ratio of 3:13 but with a preferred ratio of 2:3.

If the intermediate is derived from epoxidized material having a molecular weight greater than that of butadiene dioxide but less than about 400 suitable foams may be obtained without using any additional epoxidized material containing two or more epoxide groups per molecule.

Thus the preferred compositions suitable for production of the foamed cellular polymeric materials of this invention comprise from 81% to 16% by weight of the intermediate hereinbefore described, from 0% to 65% by weight of additional epoxidized material of molecular weight greater than about 250, from 5% to 25% by weight of foaming agent, the proportion of the remaining ingredients such as catalyst and surfactant being less than about 5% by weight.

Owing to the absence of isocyanates in the foaming compositions, these compositions have lower toxicity than the polyurethane systems. As previously mentioned, the foams prepared from these compositions are stable in the presence of moisture.

The foams of this invention have been found to be "self-extinguishing" by the American Society for Testing Materials, test D1692–59T. In contrast, an unmodified polyurethane foam when subjected to aforesaid test, is rated as "burning by this test" and the addition of flame retardants is required to render the polyurethane foam "self-extinguishing."

The intermediates above described are suitable also as reactive fire-retardant ingredients in polymeric materials derived from multifunctional vinyl ethers or polyisocyanates.

The foamed cellular polymeric materials of this invention may conveniently be prepared by first forming the intermediate from phosphorus oxyhalide and epoxidized material containing at least two epoxide groups per molecule in molar ratios ranging between 1:2 and 1:4 and then mixing said intermediate, with or without additional epoxidized material, the halohydrocarbon foaming agent, the catalyst and surfactant in a container. Foaming commences within a few seconds and the foam fills the container. Alternatively, the latent-foaming composition may be sprayed in place using apparatus known in the art.

The foamed materials of this invention have potential uses as thermal insulating material in household and commercial refrigerators. Another potential use is as building materials with thermal and sound insulating characteristics. An additional potential use is in devices providing protection against mechanical shock such as cushions and packing containers.

The invention is further illustrated but not limited by the following examples in which the parts and percentages given are by weight unless otherwise stated.

EXAMPLE 1

An intermediate ingredient was prepared as follows: Phosphorus oxychloride containing 1% of anhydrous aluminum chloride was added to 250 parts of butadiene dioxide at such a rate that the temperature of the reactants was maintained at about 60° C. When the reaction no longer maintained the temperature at 60° C., heat was applied and the temperature was raised to 70°–80° C. The addition of phosphorus oxychloride was continued until the amount theoretically required to produce tris-(2-chloro-3,4-epoxybutyl) phosphate had been added (149 parts). The resulting mixture was then stirred at 70°–80° C. for about 20 minutes and cooled.

The following two mixtures were prepared.

| Mixture A: | Parts |
|---|---|
| Intermediate | 24 |
| Low molecular weight resinous condensate of epichlorohydrin and 2:2-di-p-hydroxyphenyl propane | 36 |
| Trichloromonofluoromethane | 9 |
| Siloxane oxyalkylene copolymer type silicone surfactant | 1.2 |
| Mixture B: | |
| Trimethoxyboroxine | 3.2 |
| Boron trifluoride 10% in diethylene glycol | 1 |

Mixture B was added to Mixture A and stirred for 20 seconds. The mixture was then poured into a mould where it rose to give a white foam of uniform texture and hard skin. The foam had the following properties.

| | |
|---|---|
| Density | 2.4 lbs./cu. ft. |
| Compression strength parallel to rise after 10%, 20% and 30% compression | 9.72, 10.4, 10.9 lbs./sq. in. |
| Compression strength perpendicular to rise after 10%, 20% and 30% compression | 6.28, 7.63, 8.63 lbs./sq. in. |
| Water absorption after three days at room temperature | 11.1% by volume. |
| Humid age test (4 days at 100% R.H. at 158° F.) | Chemically stable, dimensionally unstable. |
| Flammability test (ASTM D 1692–59T) | Self-extinguishing. |

The foam possessed a degree of flexibility.

EXAMPLE 2

A composition analogous to that of Example 1 except that the phosphorus oxychloride ingredient was replaced by phosphorus oxybromide was prepared. This foam had a density of 2.20 lbs./cu. ft. and was "self-extinguishing" by ASTM test D1692–59T.

EXAMPLE 3

An intermediate ingredient was prepared as follows. 76.68 parts of phosphorus oxychloride containing 0.8 part of anhydrous aluminum chloride were added to 443.4 parts of a water dispersible diepoxide resin having an epoxy equivalent of 147.8 and of formula

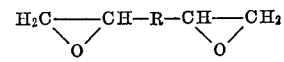

where R is an alkyl group of size sufficient to give the required epoxy equivalent at such a rate that the temperature of the reactants was maintained at 35° C. The mixture was then stirred for one hour.

The following composition was then prepared.

| | Parts |
|---|---|
| Intermediate | 25 |
| Siloxane oxyalkylene copolymer type silicone surfactant | 0.5 |
| Trimethoxyboroxine | 1.5 |
| Trichloromonofluoromethane | 4 |

After stirring there was added 1 part of a 10% solution of boron trifluoride etherate in diethylene glycol. After an induction period of 35 seconds the composition foamed to give a fine rubbery foam.

What I claim is:
1. Tris(2-chloro-3,4-epoxybutyl) phosphate.
2. Tris(2-bromo-3,4-epoxybutyl) phosphate.

References Cited

UNITED STATES PATENTS 2,724,719 11/1955 Markley et al.
3,346,667 10/1967 Firth.
3,349,103 10/1967 Cyba.

NORMA S. MILESTONE, *Primary Examiner.*

U.S. Cl. X.R.

260—2.5, 46.5, 47, 61, 824